(12) United States Patent
Park et al.

(10) Patent No.: US 7,020,123 B2
(45) Date of Patent: Mar. 28, 2006

(54) METHOD AND APPARATUS FOR TRANSMITTING AND RECEIVING WIRELESS PACKET

(75) Inventors: Dong-seek Park, Kyungki-do (KR); Jeong-hoon Park, Kyungki-do (KR); Yung-lyul Lee, Seoul (KR); John Villasenor, Los Angeles, CA (US); Adam H. Li, Los Angeles, CA (US); Fang Liu, Los Angeles, CA (US)

(73) Assignees: Samsung Electronics Co., Ltd., Kyungki-do (KR); The Regents of the University of California, Oakland, CA (US)

( * ) Notice: Subject to any disclaimer, the term of this patent is extended or adjusted under 35 U.S.C. 154(b) by 782 days.

(21) Appl. No.: 09/783,129

(22) Filed: Feb. 15, 2001

(65) Prior Publication Data
US 2002/0036993 A1 Mar. 28, 2002

Related U.S. Application Data

(60) Provisional application No. 60/192,883, filed on Mar. 29, 2000.

(30) Foreign Application Priority Data
May 6, 2000 (KR) ............................... 2000-24210

(51) Int. Cl.
*H04B 7/216* (2006.01)
(52) U.S. Cl. ...................................... 370/342; 370/471
(58) Field of Classification Search ................ 370/329, 370/328, 335, 342, 441, 470, 471, 472, 474, 370/475, 476, 312, 336, 341, 345, 346, 349, 370/252, 352, 337, 389, 395.64, 412, 469, 370/522, 537; 714/701; 398/98
See application file for complete search history.

(56) References Cited

U.S. PATENT DOCUMENTS

| 5,384,777 | A | * | 1/1995 | Ahmadi et al. ............. 370/337 |
| 5,878,041 | A | * | 3/1999 | Yamanaka et al. ...... 370/395.65 |
| 5,936,965 | A | * | 8/1999 | Doshi et al. ................. 370/469 |
| 6,061,820 | A | * | 5/2000 | Nakakita et al. ............ 714/751 |

(Continued)

FOREIGN PATENT DOCUMENTS

JP 10-093584 A 4/1998

(Continued)

OTHER PUBLICATIONS

ETSI TS 125 322 V3.1.2 (Jan. 2000), Universal Mobile Telecommunications System (UMTS); RLC Protocol Specification (3G TS 25.322 version 3.1.2 Release 1999 (XP-002168713); pp. 1-47.*

(Continued)

*Primary Examiner*—Brian Nguyen
(74) *Attorney, Agent, or Firm*—Sughrue Mion, PLLC

(57) ABSTRACT

A wireless packetization apparatus for transmitting and/or receiving multimedia data including video data in a radio transmitting/receiving system, and a method thereof are provided. According to the present invention, error resilience can be increased by adding error protection codes to one portion and a plurality of portions of multimedia-related header information, respectively, when multimedia data such as video data requiring real time or low delay are transmitted and received in a wireless environment, and a packet drop rate can thereby be reduced. Also, information can be more precise recovered by inserting length identifier and length information on an information region into the header.

8 Claims, 3 Drawing Sheets

U.S. PATENT DOCUMENTS

| | | |
|---|---|---|
| 6,104,757 A | 8/2000 | Rhee |
| 6,233,251 B1 * | 5/2001 | Kurobe et al. .............. 370/471 |
| 6,292,484 B1 * | 9/2001 | Oliver ........................ 370/389 |
| 6,310,897 B1 * | 10/2001 | Watanabe et al. ........... 370/522 |
| 6,415,398 B1 * | 7/2002 | Kikuchi et al. .............. 714/701 |
| 6,434,138 B1 * | 8/2002 | Kersken et al. ............. 370/349 |
| 6,498,667 B1 * | 12/2002 | Masucci et al. ............... 398/98 |
| 6,556,573 B1 * | 4/2003 | Kaaresoja .............. 370/395.64 |
| 6,574,226 B1 * | 6/2003 | Nakano et al. ........ 370/395.64 |
| 6,590,909 B1 * | 7/2003 | Stacey et al. ............... 370/537 |
| 6,714,553 B1 * | 3/2004 | Poole et al. ................ 370/412 |
| 6,791,963 B1 * | 9/2004 | Hwang et al. .............. 370/342 |
| 2003/0034911 A1 * | 2/2003 | Martini et al. .............. 341/173 |
| 2003/0212827 A1 * | 11/2003 | Saha et al. .................. 709/247 |
| 2004/0010609 A1 * | 1/2004 | Vilander et al. ............ 709/230 |

FOREIGN PATENT DOCUMENTS

| | | |
|---|---|---|
| JP | 11088301 A * | 3/1999 |
| KR | 96-33096 A | 9/1996 |
| WO | WO 99/21296 | 4/1999 |
| WO | WO 00/4677 | 1/2000 |

OTHER PUBLICATIONS

English Abstract, abstracting WO 99/07100 published Feb. 11, 1990.

* cited by examiner

METHOD AND APPARATUS FOR TRANSMITTING AND RECEIVING WIRELESS PACKET

This application claims the benefit under 35 U.S.C. § 119(e)(1) of and incorporates by reference Provisional Application No. 60/192,883 filed on Mar. 29, 2000. This application also incorporates by reference Korean Patent Application No. 00-24210 filed on May 6, 2000.

BACKGROUND OF THE INVENTION

1. Field of the Invention

The present invention relates to a radio transmitting/receiving system. More particularly, the present invention relates to a wireless packetization apparatus for transmitting and/or receiving multimedia data including video data in a radio transmitting/receiving system, and a method thereof.

2. Description of the Related Art

In general, a radio transmitter and a radio receiver employing a phase 1 standard in CDMA 2000 are formed of high-level layers as shown in FIG. 1.

Codec-related standards such as H.324M, H.323, and T.120 correspond to an application layer. The physical layer performs channel coding, PN spreading, and modulation. The media access control (MAC) layer includes a signaling unit (not shown) and a radio link protocol (hereinafter referred to as RLP) (not shown), and the RLP converts payload on the application layer transmitted through a radio path into an input format on the physical layer. The physical layer among the three layers is mainly realized by hardware, thereby reducing its flexibility when its hardware is determined by a standard. However, flexibility can be given to the application layer considering its network-independent portion.

Referring to FIG. 2, one RLP corresponds to each of a number N of applications (application 1, application 2, . . . , and application N). The RLP is connected to a physical layer 240 through a multiplex (MUX) sub-layer 230.

The MUX sub-layer 230 multiplexes a number N of received RLPs adaptively to a protocol data unit (PDU). Here, a multiplex-protocol data unit (MUX-PDU) is available in a case where a channel bit error rate is less than 10−6.

In the frame of RLP type 3 of FIG. 3, reference numeral 310 denotes a service reference identification (ID), reference numeral 320 denotes an arbitrary user region, and reference numeral 330 denotes payload, which is received from an application layer. However, in a conventional radio transmitting/receiving system employing the frame structure of FIG. 3, when even a part of header portions 310 and 320 is damaged, it is impossible for a recipient to know the exact length of the DATA field, and consequently, RLP decoding is not possible.

SUMMARY OF THE INVENTION

To solve the above problems, it is a first object of the present invention to provide a wireless packetization method for increasing error-robustness while reducing overhead so that multimedia data including video data may be suitable in a wireless environment.

It is a second object of the present invention to provide a wireless packetization apparatus in which the wireless packetization method is implemented.

It is a third object of the present invention to provide a method for decoding a wireless packet in which the packetized frame data are decoded by the wireless packetization method.

It is a fourth object of the present invention to provide an apparatus for receiving a wireless packet in which the method for decoding a wireless packet is implemented.

Accordingly, to achieve the first object, there is provided a wireless packetization method in a radio transmitting and receiving system for transmitting and/or receiving multimedia data in a wireless environment. The method comprises the steps of: dividing multimedia data-related header information into one portion and a plurality of portions, respectively; and adding error checking or protection codes to each of the divided header information.

According to another aspect of the first object, there is provided a wireless packetization method in a radio transmitting and receiving system for transmitting and/or receiving multimedia data in a wireless environment. The method comprises the steps of: adding a length field for indicating the length of data in a data region and a length indicator field for identifying the length of the length field on a multiplex (MUX) layer where the multimedia data is multiplexed into predetermined units of header information.

According to still another aspect of the first object, there is provided a wireless packetization method in a radio transmitting and receiving system for transmitting and/or receiving multimedia data in a wireless environment. The method comprises the steps of: adding a length field for indicating the length of data in a data region and a length indicator field for identifying the length of the length field on a multiplex (MUX) layer where the multimedia data is multiplexed into predetermined units of header information; and forming a predetermined protocol frame by adding error checking or protection codes to each of the length field and the length indicator field.

In order to achieve the second object, there is provided a wireless packetization apparatus in a radio transmitting apparatus for transmitting multimedia data on a multiplex (MUX) sub-layer in a wireless environment. The apparatus includes a header information-creating unit for creating a first field which indicates the number of potential bits of the length of data and a second field indicating the length of the data and for adding error protection codes to each of the header information which is divided into one portion and a plurality of portions, respectively, and a frame-forming unit for forming a frame having the unit of protocol data by multiplexing the header information formed in the header information-creating unit and the data.

In order to achieve the third object, there is provided a method for decoding a wireless packet by receiving a packet in which error protection codes are added to one portion and a plurality of portions of the header information, respectively, on a wireless multiplex (MUX) sub-layer in a multimedia data transmitting system. The method comprises the steps of: (1) discarding the previous frame in a case where there is some error and checking a second error protection code added to the next header information portion in a case where there is no error, when a first error protection code added to the initial header information is checked; and (2) transmitting data to an upper layer in a case where there is no error and transmitting a blank data block to the upper layer in a case where there is some error, when the second error protection code is checked.

In order to achieve the fourth object, there is provided an apparatus for receiving a wireless packet in an apparatus for decoding data by receiving a packet in which error protection codes are added to one portion and a plurality of portions of the header information, respectively, on a wireless multiplex (MUX) sub-layer in a multimedia data transmitting system. The apparatus includes (1) a means for discarding the previous frame in a case where there is some error and checking a second error protection code added to the next header information portion in a case where there is no error, when a first error protection code added to the initial header information is checked, and (2) a means for transmitting data to an upper layer in a case where there is no error and transmitting a blank data block to the upper layer in a case where there is some error, when the second error protection code is checked.

BRIEF DESCRIPTION OF THE DRAWINGS

The above objects and advantages of the present invention will become more apparent by describing in detail a preferred embodiment thereof with reference to the attached drawings as described below.

DETAILED DESCRIPTION OF THE INVENTION

Figure 4:
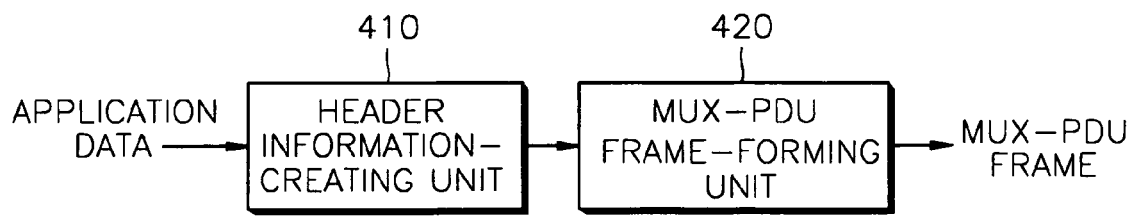
FIG. 4 is a conceptual diagram of MUX-PDU framing according to the present invention.

Referring to FIG. 4, a header information-creating unit 410 denotes a SR_ID field for indicating a service reference identification (ID). It alsocreates a length indicator field for identifying the length field and a length field for indicating the length of the data. The header information-creating unit 410 divides header information into one portion and a plurality of portions, respectively, and adds error protection codes to each of the divided header information.

A MUX-PDU frame-forming unit 420 forms a MUX-PDU frame by multiplexing header information formed in the header information-creating unit 410 and payload.

Figure 5:
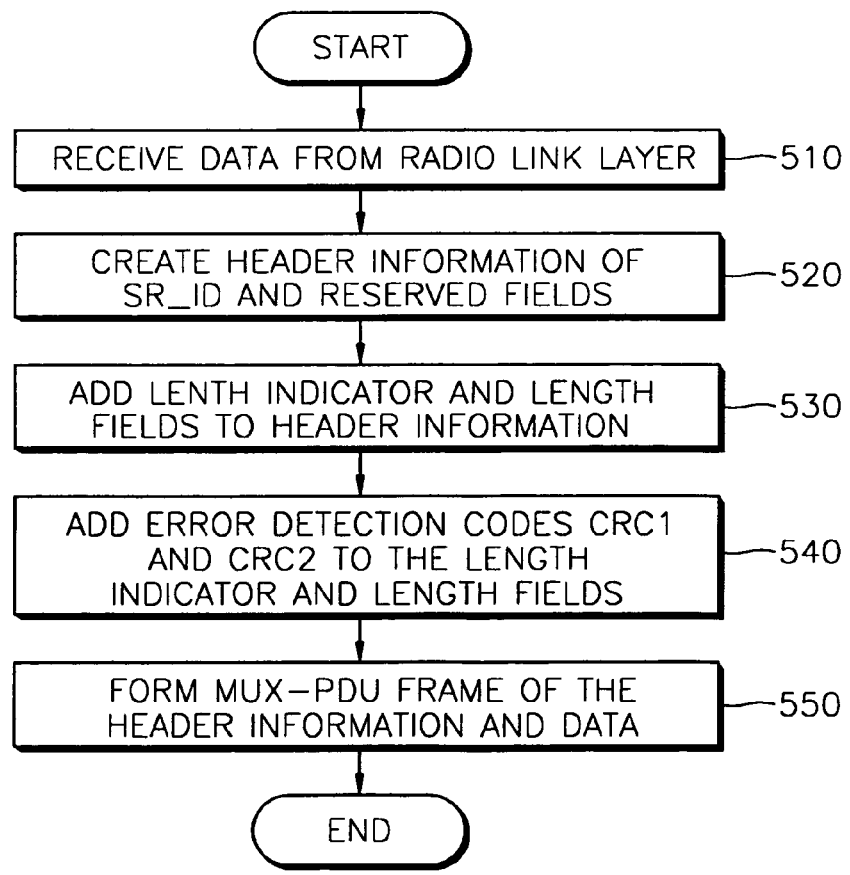
FIG. 5 is a flow chart illustrating a method for encoding the MUX-PDU framing according to the present invention.

Referring to FIG. 5, video and audio data, which are generated from an application layer, are transmitted to a MUX sub-layer through a RLP layer (step 510).

Next, the MUX sub-layer creates a SR_ID field for indicating a service reference identification (ID) and a Reserved field for indicating an arbitrary user region (step 520).

Next, the MUX sub-layer creates a Length field for indicating the length of data and a Length Indicator field for identifying the length of the Length field, and adds the length indicator field and the length field to the header information (step 530).

Next, the MUX sub-layer (1) creates a first cyclic redundancy code (CRC1) and a second cyclic redundancy code (CRC2), which correspond to error detection codes, by checksumming bits of each of the Length Indicator field and the Length field, and (2) adds CRC1 and CRC2 to the Length Indicator field and the Length field (step 540).

Next, the MUX sub-layer forms a MUX-PDU frame of payload and header information including the SR_ID field, the Reserved field, the Length Indicator field, the first CRC field (CRC1), the Length field, and the second CRC field (CRC2) (step 550).

Figure 1:
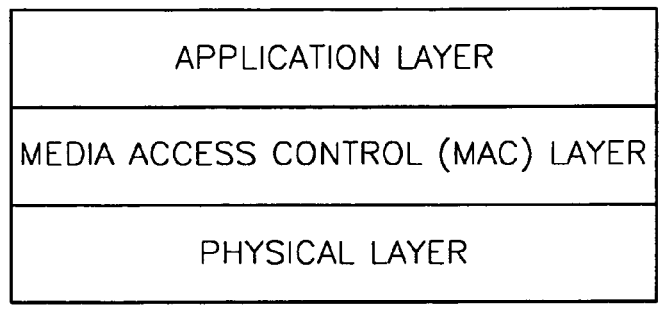
FIG. 1 is a block diagram of a conventional radio transmitter/receiver employing a phase 1 in CDMA 2000.
Figure 2:
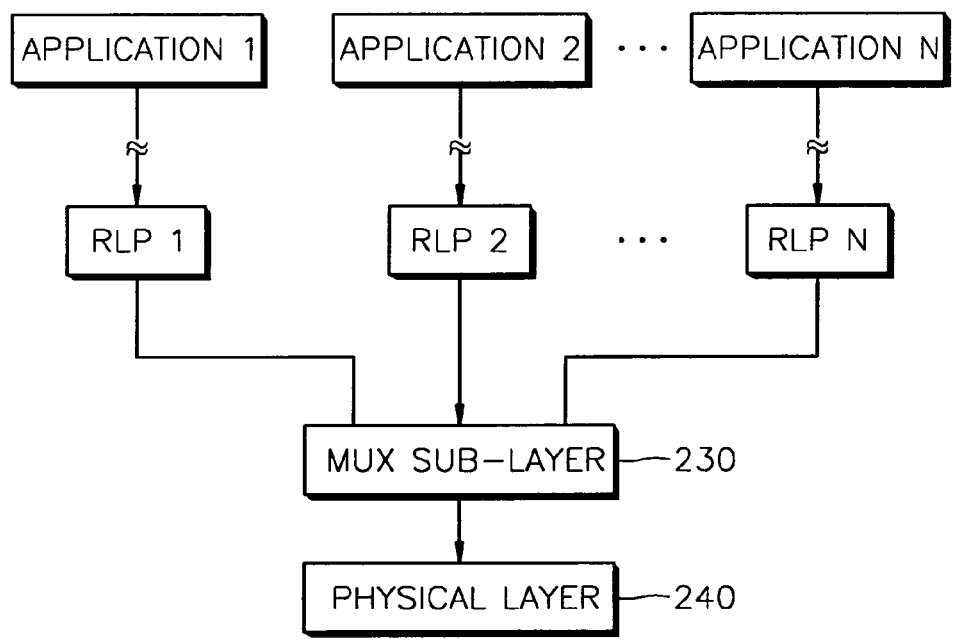
FIG. 2 is a block diagram which illustrates relations between RLP and a MUX sub-layer.
Figure 3:
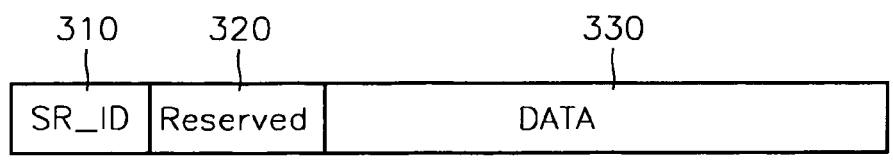
FIG. 3 is a format diagram of a frame of MUX-PDU type 3 in CDMA version 2000.
Figure 6:
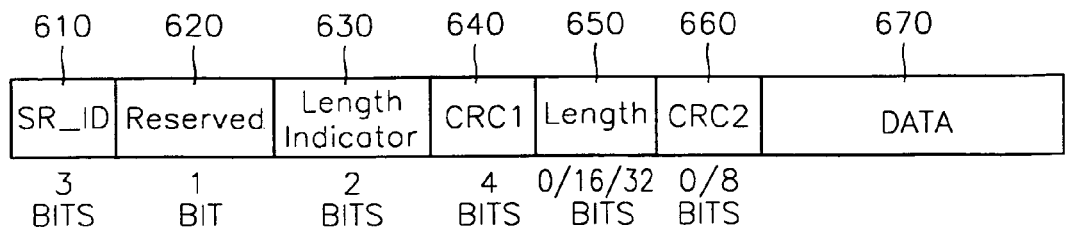
FIG. 6 is a format diagram of a new MUX-PDU frame according to the present invention.

A MUX-PDU frame shown in FIG. 6 is formed of a header portion comprising a SR_ID field 610, a Reserved field 620, a Length Indicator field 630, a first CRC field (CRC1) 640, a Length field 650, a second CRC field (CRC2) 660 and a DATA field 670. The Length Indicator field 630 and the Length field 650 are added to the SR_ID field 610 and the Reserved field 620, which are contained in the conventional header (see FIG. 3). Also, the first CRC field (CRC1) 640 for error-protecting the SR_ID field 610, the Reserved field 620, and the Length Indicator 630, are added to the Length Indicator field 630, and a second CRC field (CRC2) 660 for error-protecting the Length field 650 is added to the Length field 650. Here, preferably, the Length Indicator field 630 is comprised of three potential sizes of Length field 650, that is, 2 bits for indicating "0", "$1\sim2^{16}-1$", and "$2^{16}\sim2^{32}-1$". Preferably, the Length field 650 is indicated as one of 0, 16, 32 bits. The first CRC field 640 is calculated by checksumming the bits of the SR-ID field 610, the Reserved field 620, and the Length Indicator field 630 and is preferably comprised of 4 bits. The second CRC field 650 is calculated by checksumming the bits of the Length Indicator field 630 and is preferably comprised of one of 0 or 8 bits.

Also, people skilled in the art can properly select a polynomial operator p(x) for the CRC of the specific length. For example, in case of 4-bit CRC, the polynomial operator $p(x)=x^4+x^2+x+1$ can be used, and in case of 8-bit CRC, the polynomial operator $p(x)=x^8+x^2+x+1$ can be used.

Figure 7:
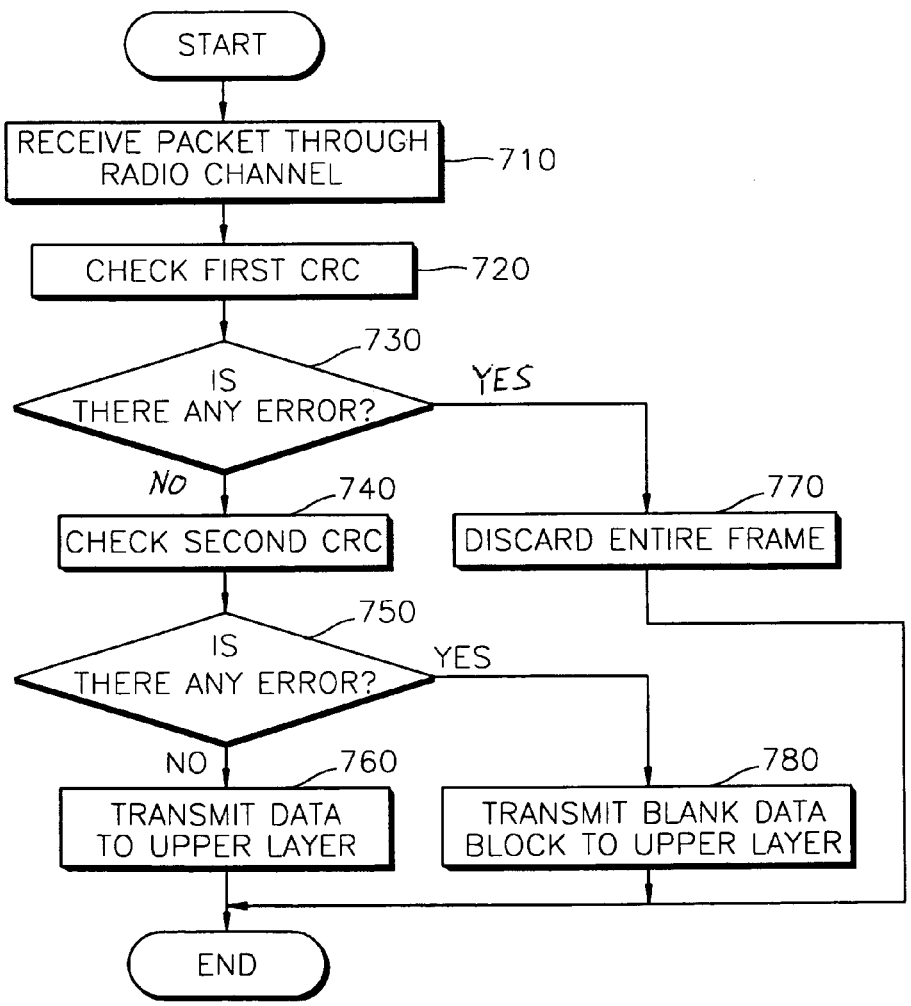
FIG. 7 is a flow chart illustrating a preferred embodiment for decoding the encoded MUX-PDU frame.

Decoding the encoded MUX_PDU frame in a preferred embodiment will be described with reference to FIG. 7.

First, a receiver performs error-checking, because error protection codes are added to one portion and a plurality of portions of the header information in a packet received through a radio channel, respectively (step 710). That is, the receiver checks a first CRC 640 on a DeMUX sub-layer (steps 720 and 730), and when there is some error, the previous frame is discarded (step 770). If there is no error, a second CRC 660 is checked (step 740). If the receiver checks the second CRC 660 on the DeMUX sub-layer (steps 740) and when there is no error (step 750), data is transmitted to an upper layer (step 760), but if there is some error (step 750), a blank data block is transmitted to the upper layer (step 780). The Length Indicator field 630 and the Length field 650 are error-checked by the first CRC 640 and the second CRC 660, and even though there is some error during their transmission, the reliability of the length of the data is increased.

The above encoding and decoding methods can be embodied in a computer program. Codes and code segments encompassing the program can be easily inferred by a skilled computer programmer in the art. Also, the program can be realized in media used in a computer and in a common digital computer for operating the program. The program can be stored in computer readable media. The media can include magnetic media such as a floppy disk or a hard disk and optical media such as a CD-ROM or a digital video disc (DVD). Also, the program can be transmitted by carrier waves such as the Internet.

As described above, error resilience can be increased by adding error protection codes to one portion and a plurality of portions of the header information in MUX-PDU, respectively, when multimedia data such as video data requiring real time or low delay are transmitted and received in a wireless environment, and a packet drop rate can thereby be reduced. Also, the reliability of the length of an information region is increased by inserting length identifier and length information on an information region into the header.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A wireless packetization method in a radio transmitting/receiving system for transmitting and/or receiving multimedia data in a wireless environment, comprising the steps of:
dividing multimedia data-related header information into one portion and a plurality of portions, respectively;
adding a length field for indicating the length of data in a data region and a length indicator field for identifying the length of the length field to each of the divided header information; and
forming a predetermined protocol frame by adding a first error protection code for error-protecting the length field and a second error protection code for error-protecting the length indicator field to each of the length field and the length indicator field.

2. The wireless packetization method according to claim 1, wherein the error protection codes are cyclic redundancy codes (CRC).

3. A wireless packetization method in a radio transmitting/receiving system for transmitting and/or receiving multimedia data in a wireless environment, comprising the steps of:
adding a length field and a length indicator field, wherein the length field indicates the length of data in a data region and the length indicator field identifies the length of the length field on a multiplex (MUX) layer where the multimedia data are multiplexed into predetermined units of header information; and
forming a predetermined protocol frame by adding error checking or protection codes to both the length field and the length indicator field.

4. The wireless packetization method according to claim 3, wherein the error protection codes comprising:
a first error protection code for error-protecting the length indicator field in the header information; and
a second error protection code for error-protecting the length field.

5. The wireless packetization method according to claim 4, wherein the first error protection code and the second error protection code are comprised of 4 bits or 8 bits for controlling an error of the header information.

6. A method for decoding a wireless packet by receiving a packet in which error protection codes are added to one portion and a plurality of portions of header information, respectively, on a wireless multiplex (MUX) sub-layer in a multimedia data transmitting system, comprising the steps of:
discarding a previous frame in a case where there is some error and checking a second error protection code added to a next header information in a case where there is no error, when a first error protection code added to an initial header information is checked; and
transmitting data to an upper layer in a case where there is no error and transmitting a blank data block to the upper layer in a case where there is some error, when the second error protection code is checked.

7. A wireless packetization apparatus in a radio transmitting apparatus for transmitting multimedia data on a multiplex (MUX) sub-layer in a wireless environment, comprising:
a header information-creating unit for creating a first field and a second field, wherein the first field indicates the numbers of potential bits of the length of data and the second field indicates the length of the data and for adding error protection codes to each portion of header information which are divided into one portion and a plurality of portions, respectively; and
a frame-forming unit for forming a frame having the unit of protocol data by multiplexing the header information formed in the header information-creating unit and the data.

8. An apparatus for receiving a wireless packet in an apparatus for decoding data by receiving a packet in which error protection codes are added to one portion and a plurality of portions of header information, respectively, on a wireless multiplex (MUX) sub-layer in a multimedia data transmitting system, comprising:
a checking means for discarding a previous frame in a case where there is some error and checking a second error protection code added to a next header information in a case where there is no error, when a first error protection code added to an initial header information is checked; and
a transmitting means for transmitting data to an upper layer in a case where there is no error and transmitting a blank data block to the upper layer in a case where there is some error, when the second error protection code is checked.

* * * * *